US012128340B2

(12) United States Patent
Bannister et al.

(10) Patent No.: US 12,128,340 B2
(45) Date of Patent: Oct. 29, 2024

(54) LAYERED FILTER FRAME

(71) Applicant: Cummins Filtration IP, Inc, Columbus, IN (US)

(72) Inventors: Robert A. Bannister, Ames, IA (US); Jeffrey A. Rech, Verona, WI (US); Clinton T. Woods, Neillsville, WI (US); Jeff S. Eyers; Jessie A. Knight, Oregon, WI (US)

(73) Assignee: Cummins Filtration IP, Inc, Columbus, IN (US)

( * ) Notice: Subject to any disclaimer, the term of this patent is extended or adjusted under 35 U.S.C. 154(b) by 573 days.

(21) Appl. No.: 17/296,780

(22) PCT Filed: Nov. 21, 2019

(86) PCT No.: PCT/US2019/062571
§ 371 (c)(1),
(2) Date: May 25, 2021

(87) PCT Pub. No.: WO2020/112482
PCT Pub. Date: Jun. 4, 2020

(65) Prior Publication Data
US 2022/0088518 A1 Mar. 24, 2022

Related U.S. Application Data

(60) Provisional application No. 62/772,737, filed on Nov. 29, 2018.

(51) Int. Cl.
*B01D 46/02* (2006.01)
*B01D 46/00* (2022.01)
(Continued)

(52) U.S. Cl.
CPC ......... *B01D 46/0002* (2013.01); *B01D 46/10* (2013.01); *B01D 46/4227* (2013.01); *B01D 2271/022* (2013.01)

(58) Field of Classification Search
CPC .............. B01D 46/0002; B01D 46/10; B01D 46/4227; B01D 2271/022
See application file for complete search history.

(56) References Cited

U.S. PATENT DOCUMENTS

| | | | | |
|---|---|---|---|---|
| 2 A | * | 7/1836 | Goulding | D01G 21/00 57/58.49 |
| 4,685,944 A | | 8/1987 | Allan et al. | |

(Continued)

FOREIGN PATENT DOCUMENTS

| | | |
|---|---|---|
| CA | 2844331 A | 9/2014 |
| CN | 1658946 A | 8/2005 |

(Continued)

OTHER PUBLICATIONS

First Office Action issued for Chinese Patent Application CN 201980078066.3 issued Mar. 11, 2022, 9 pages.
(Continued)

Primary Examiner — Stephen Hobson
(74) Attorney, Agent, or Firm — Foley & Lardner LLP

(57) ABSTRACT

Various embodiments relate to a filter element. The filter element includes a first filter end, second filter end, filter media, and filter frame. The second filter end is disposed axially away from the first filter end. The filter media extends axially between a first filter end and a second filter end. The filter frame is adjacent to the first filter end. The filter frame includes a first frame end, a second frame end, a first frame endwall, a second frame endwall, a first frame sidewall, and a second frame sidewall. The second frame end is disposed axially away from the first frame end. The first frame endwall extends axially away from the first frame end toward the second frame end. The second frame endwall extends axially away from the first frame end toward the (Continued)

second frame end. The second frame endwall is disposed longitudinally away from the first frame endwall.

10 Claims, 8 Drawing Sheets

(51) Int. Cl.
    *B01D 46/10*        (2006.01)
    *B01D 46/42*        (2006.01)

(56) References Cited

U.S. PATENT DOCUMENTS

| | | | | |
|---|---|---|---|---|
| 4,961,762 | A * | 10/1990 | Howeth | B01D 46/10 55/497 |
| 6,179,143 | B1 * | 1/2001 | Grob | B29B 11/04 215/398 |
| 6,190,432 | B1 | 2/2001 | Gieseke et al. | |
| 6,293,984 | B1 * | 9/2001 | Oda | B01D 46/10 55/497 |
| 6,444,158 | B1 * | 9/2002 | Grob | B65D 23/106 215/396 |
| 6,783,565 | B2 | 8/2004 | Finnerty et al. | |
| 7,475,480 | B2 * | 1/2009 | Votolato | B26B 29/02 30/294 |
| 7,625,419 | B2 * | 12/2009 | Nelson | B01D 46/4227 55/357 |
| 7,674,308 | B2 * | 3/2010 | Krisko | B01D 46/527 55/498 |
| 7,931,725 | B2 * | 4/2011 | Wydeven | B01D 46/527 55/497 |
| 8,146,737 | B2 * | 4/2012 | D'Agostino | B65D 71/0007 206/427 |
| 8,277,532 | B2 * | 10/2012 | Reichter | B01D 46/0005 55/497 |
| 8,292,983 | B2 * | 10/2012 | Reichter | B01D 46/62 55/497 |
| 8,449,638 | B2 * | 5/2013 | Gieseke | B01D 46/525 55/357 |
| 8,480,779 | B2 * | 7/2013 | Boehrs | B01D 46/525 55/497 |
| 8,506,668 | B2 * | 8/2013 | Swanson | B01D 46/0001 55/498 |
| 8,685,128 | B2 * | 4/2014 | Schrage | F02M 35/02483 55/497 |
| 9,399,972 | B2 * | 7/2016 | Boehrs | B01D 46/0005 |
| 9,457,310 | B2 * | 10/2016 | Schrage | B01D 46/0001 |
| 9,724,635 | B2 * | 8/2017 | Merritt | B01D 46/526 |
| 9,795,911 | B2 | 10/2017 | Reichter et al. | |
| 10,556,201 | B2 | 2/2020 | Reichter et al. | |
| 2002/0096247 | A1 * | 7/2002 | Wydeven | B01D 46/525 156/307.7 |
| 2002/0100262 | A1 * | 8/2002 | Gieseke | B01D 46/10 55/385.3 |
| 2003/0217534 | A1 * | 11/2003 | Krisko | B01D 50/20 55/482 |
| 2003/0233859 | A1 * | 12/2003 | Luebke | B21D 7/063 72/458 |
| 2006/0137311 | A1 * | 6/2006 | Sundet | B01D 46/10 55/357 |
| 2007/0163079 | A1 * | 7/2007 | Cude | B65D 25/2826 16/114.1 |
| 2008/0016832 | A1 * | 1/2008 | Krisko | B01D 46/525 55/342 |
| 2008/0184685 | A1 * | 8/2008 | Kempf | B01D 46/0005 55/497 |
| 2008/0303300 | A1 * | 12/2008 | Hill | A45F 3/14 294/167 |
| 2010/0000190 | A1 * | 1/2010 | Kidman | B01D 46/521 55/504 |
| 2010/0251902 | A1 * | 10/2010 | Schandel | A47J 36/10 99/348 |
| 2011/0011782 | A1 * | 1/2011 | Myers | B01D 29/07 210/232 |
| 2011/0173937 | A1 * | 7/2011 | Nelson | B01D 46/525 55/497 |
| 2012/0085774 | A1 * | 4/2012 | Luburic | B65D 25/32 220/754 |
| 2012/0110962 | A1 * | 5/2012 | Dewit | B01D 46/0005 55/357 |
| 2013/0239530 | A1 * | 9/2013 | Reichter | B01D 46/0005 264/258 |
| 2014/0014597 | A1 * | 1/2014 | Knight | B01D 29/50 210/806 |
| 2014/0102059 | A1 * | 4/2014 | Boehrs | B01D 46/525 55/497 |
| 2014/0250843 | A1 * | 9/2014 | Krull | B01D 46/0005 55/357 |
| 2014/0260139 | A1 * | 9/2014 | Merritt | B01D 46/0005 55/497 |
| 2014/0318090 | A1 * | 10/2014 | Rieger | B01D 46/10 55/495 |
| 2014/0318091 | A1 * | 10/2014 | Rieger | F02M 35/02416 55/502 |
| 2014/0331627 | A1 * | 11/2014 | Majer | B01D 39/08 156/330.9 |
| 2015/0013282 | A1 * | 1/2015 | Sorger | B01D 46/521 55/357 |
| 2015/0321796 | A1 * | 11/2015 | O'Leary | B65D 3/06 220/675 |
| 2015/0343358 | A1 * | 12/2015 | Caliendo | B01D 46/10 55/497 |
| 2016/0075265 | A1 * | 3/2016 | Claire | B60N 3/02 296/1.02 |
| 2016/0220935 | A1 * | 8/2016 | Ruhland | B01D 46/521 |
| 2017/0014743 | A1 * | 1/2017 | Varghese | B01D 46/4227 |
| 2017/0095761 | A1 * | 4/2017 | Knight | B01D 46/12 |
| 2018/0008923 | A1 * | 1/2018 | Burton | B01D 46/4227 |
| 2018/0169555 | A1 * | 6/2018 | Von Seggern | B01D 46/0004 |
| 2023/0364542 | A1 * | 11/2023 | Schwartz | B01D 46/0001 |
| 2024/0033670 | A1 * | 2/2024 | Dirnberger | B01D 46/0006 |

FOREIGN PATENT DOCUMENTS

| | | |
|---|---|---|
| CN | 1911487 A | 2/2007 |
| CN | 102039072 A | 5/2011 |
| CN | 206483264 A | 9/2017 |
| DE | 24 24 339 A | 1/1975 |
| DE | 10 2009 060 214 A1 | 6/2011 |
| DE | 10 2015 011 339 A1 | 3/2016 |
| DE | 20 2018 105 359 U | 11/2018 |
| EP | 1 306 120 A | 5/2003 |
| EP | 2 281 497 A | 2/2011 |
| JP | H10-263348 A | 10/1998 |
| WO | WO-97/40918 A1 | 11/1997 |
| WO | WO-2017/133797 A | 8/2017 |

OTHER PUBLICATIONS

International Search Report and Written Opinion issued Feb. 4, 2020 in PCT/US2019/062571, 20 pages.

\* cited by examiner

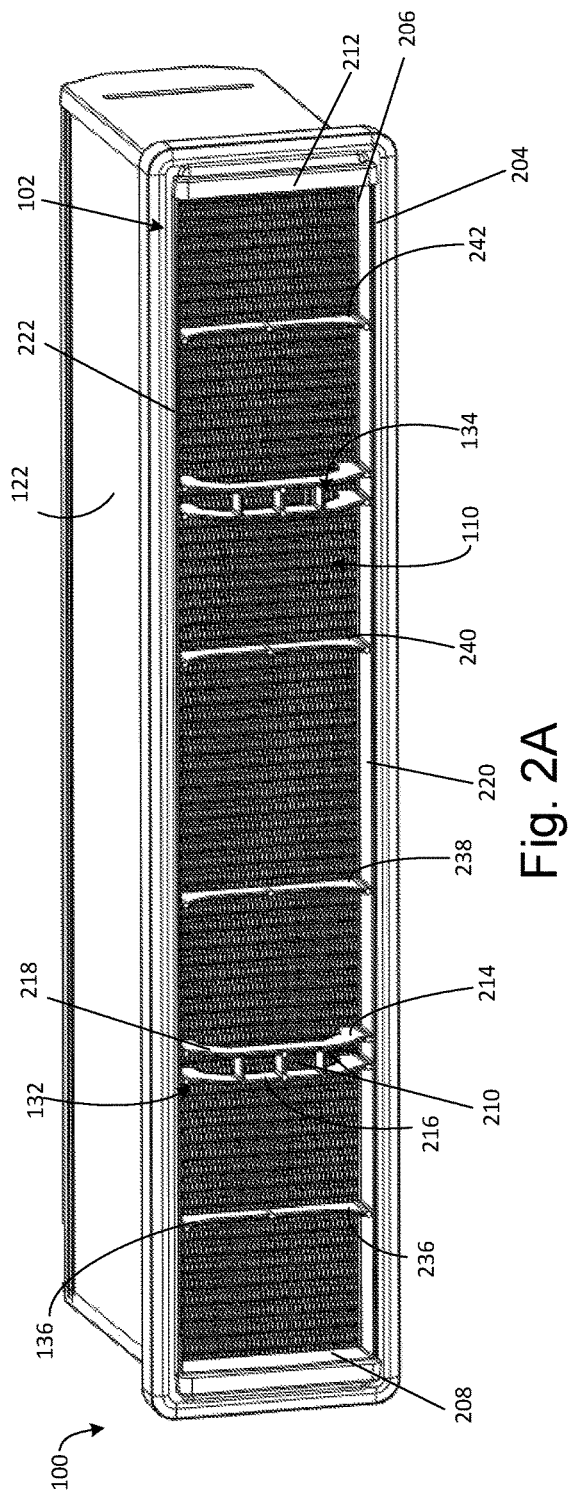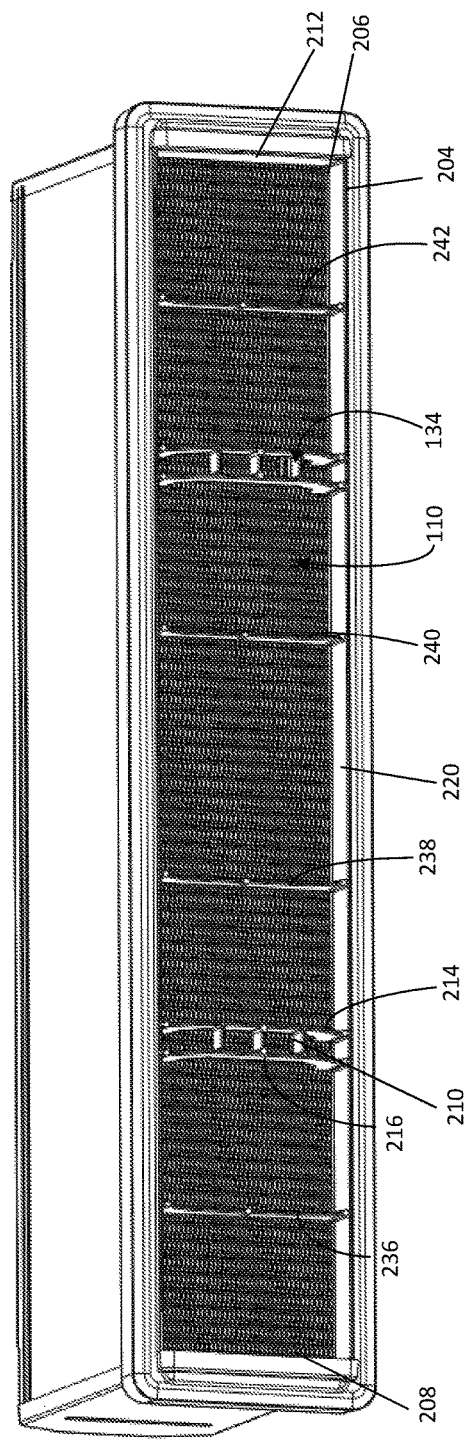

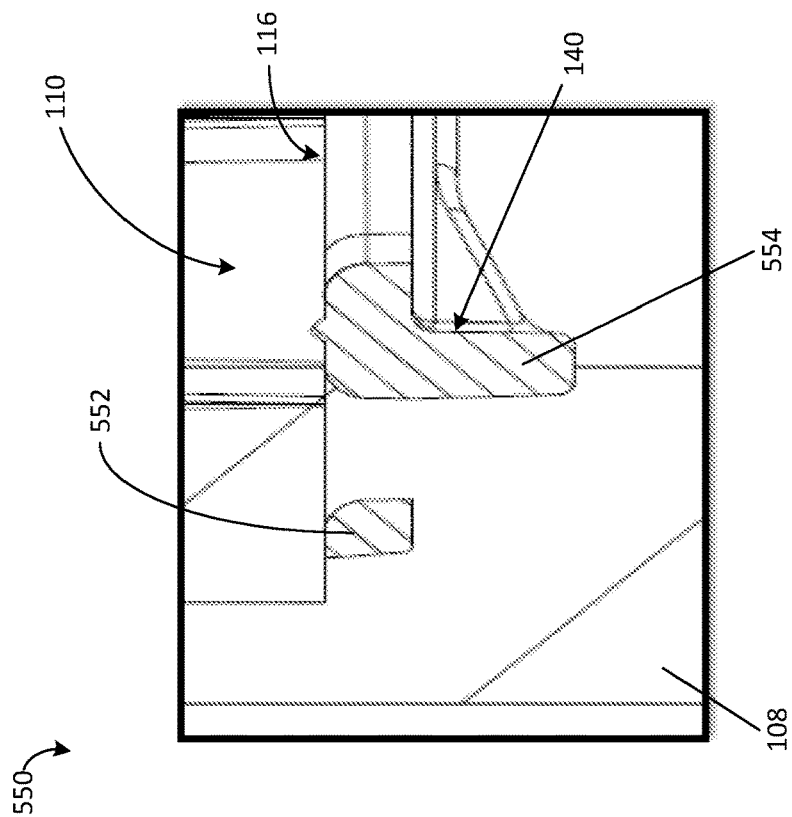
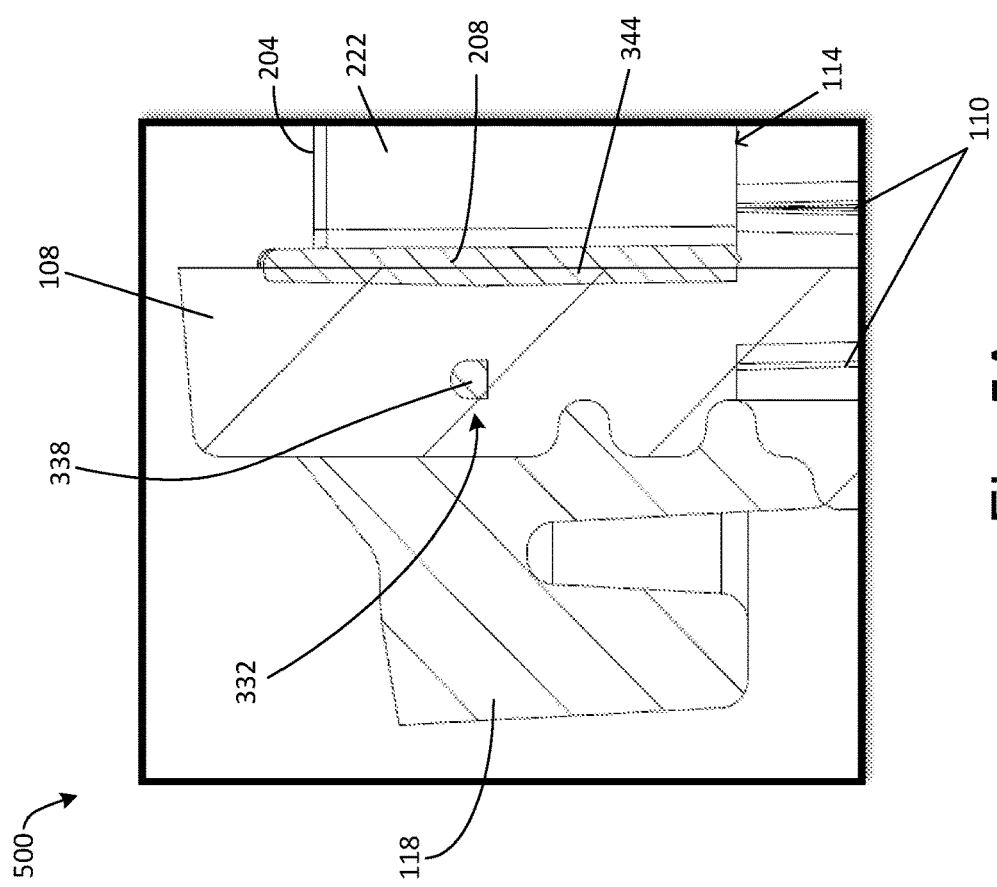
Fig. 5B
Fig. 5A

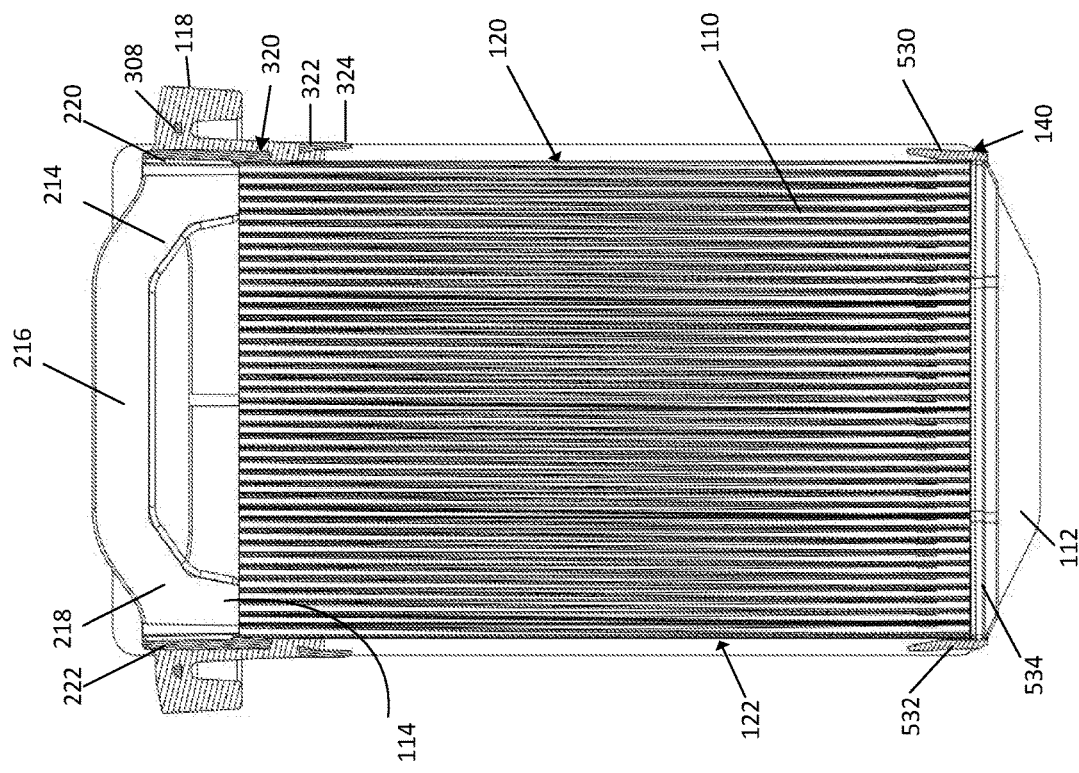
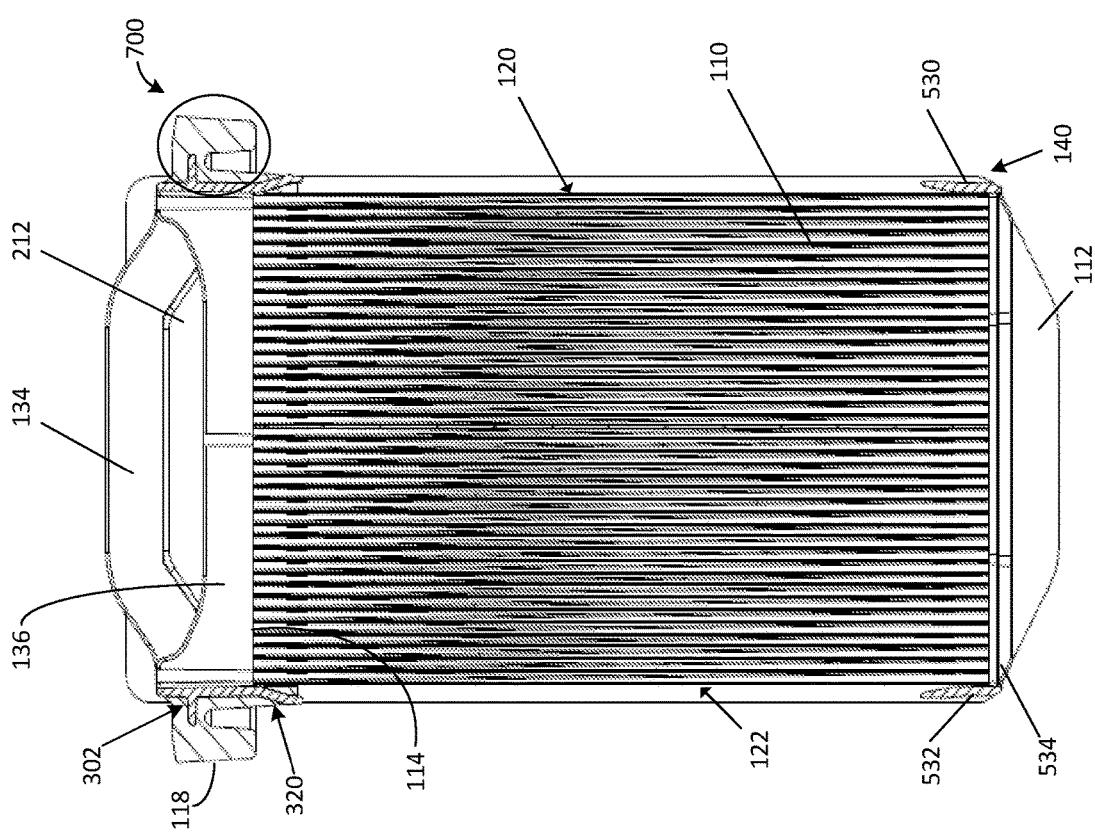
Fig. 6A
Fig. 6B

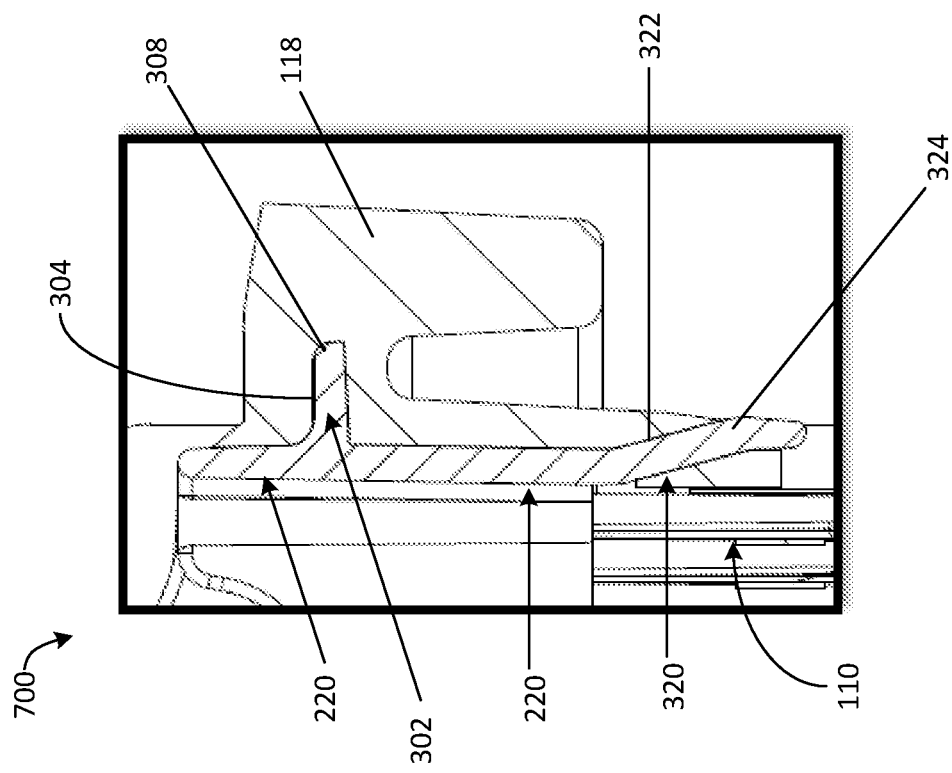

LAYERED FILTER FRAME

CROSS-REFERENCE TO RELATED PATENT APPLICATION

The present application is a National Phase of PCT/US2019/062571, filed Nov. 21, 2019, which claims the benefit of priority to U.S. Provisional Patent Application No. 62/772,737, filed Nov. 29, 2018. The contents of these applications are incorporated herein by reference in their entirety.

TECHNICAL FIELD

The present application relates to filtration systems.

BACKGROUND

Internal combustion engines generally combust a mixture of fuel (e.g., gasoline, diesel, natural gas, etc.) and air. Many or all of the fluids passing through the internal combustion engine are filtered to remove particulate and contaminants from the fluids prior to entering the internal combustion engine. For example, prior to entering the engine, intake air is typically passed through a filter element to remove contaminants (e.g., particulates, dust, water, etc.) from the intake air prior to delivery to the engine. The filter media of the filter element captures and removes particulate from the intake air passing through the filter media. As the filter media captures and removes particulate, the restriction of the filter media increases. The filter media has what is commonly referred to as a dust holding capacity that defines the amount of particulate that the filter media can capture without the need for replacement. After the dust holding capacity of the filter media is reached, the filter element may require replacement.

SUMMARY

Various example embodiments relate to a filter element. The filter element includes a first filter end, a second filter end, filter media, and a filter frame. The second filter end is disposed axially away from the first filter end. The filter media extends axially between a first filter end and a second filter end. The filter frame is adjacent to the first filter end. The filter frame includes a first frame end, a second frame end, a first frame endwall, a second frame endwall, a first frame sidewall, and a second frame sidewall. The second frame end is disposed axially away from the first frame end. The first frame endwall extends axially away from the first frame end toward the second frame end. The second frame endwall extends axially away from the first frame end toward the second frame end. The second frame endwall is disposed longitudinally away from the first frame endwall. The first frame sidewall extends longitudinally from the first frame endwall toward the second frame endwall. The second frame sidewall extends longitudinally from the first frame endwall toward the second frame endwall. The second frame sidewall is disposed laterally away from the first frame sidewall. At least one handle is configured to facilitate removal and installation of the filter element.

Other example embodiments relate to a filter frame. The filter frame includes a first frame end, a second frame end, a first frame endwall, a second frame endwall, a first frame sidewall, and a second frame sidewall. The second frame end is disposed axially away from the first frame end. The first frame endwall extends axially away from the first frame end toward the second frame end. The second frame endwall extends axially away from the first frame end toward the second frame end. The second frame endwall is disposed longitudinally away from the first frame endwall. The first frame sidewall extends longitudinally from the first frame endwall toward the second frame endwall. The second frame sidewall extends longitudinally from the first frame endwall toward the second frame endwall. The second frame sidewall is disposed laterally away from the first frame sidewall. At least one handle is configured to facilitate removal and installation of the filter frame.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 2A shows a top perspective view of the filter element with the filter frame of FIG. 1.

FIG. 2B shows a top perspective view of the filter element with the filter frame of FIG. 1.

FIG. 5A shows a detailed view of an upper portion of an inlet frame, the entirety of which is shown in FIG. 3, and an end panel and seal as shown in FIG. 4.

FIG. 5B shows a detailed view of a portion of an outlet frame, the entirety of which is shown in FIG. 8, and an end panel as shown in FIG. 4.

FIG. 6A shows a cross-sectional side view of the filter element with the filter frame of FIG. 1.

FIG. 6B shows another cross-sectional side view of the filter element with the filter frame of FIG. 1.

FIG. 7 shows a cross-sectional side view of an upper portion of the filter frame and an end panel of FIG. 6A.

DETAILED DESCRIPTION

Referring to the figures generally, a filter frame for providing structural support and handling features for a filter element is described. The filter frame is configured to increase the efficiency of filtration by increasing the amount of usable filter media of the filter element and assist in holding an inlet portion of the filter media together. The filter frame may be configured to provide structural support and features to filter elements that have a plurality of flow channels having a tetrahedral shape. As will be appreciated, filter media with multiple layers having a plurality of flow channels allows for cross flow along the length of each layer as a result of the filter media structure being tapered into and out of the depth (e.g., slit width) of the filter media. Some filtration systems may implement adhesive beads to attach adjacent layers of filter media to provide structure to the filter media block (e.g., structural support to the filter media as outward forces are exerted onto the filter media layers during operation) at the expense of filtration efficiency and cross-flow. Beneficially, the filter frame is configured to limit—or in some embodiments, eliminate—the need for adhesive beads between layers of the filter media by providing structure and support around an outside portion of the filter element and/or filter media. The absence of adhesive beads, due to the implementation of the filter frame, allows for the filter media to flex under operation and to open up more volume on the inlet (e.g., upstream dirty side), thereby improving cross flow and maximizing volume (e.g., improve filter efficiency) for loading of the filter media.

The filter frame may be configured to create boundaries to limit urethane adhesive blow over the top of the filter media, thereby increasing the usable filter media area. Specifically, the filter frame may include one or more support structures around an inlet end that reduces polyurethane (e.g., urethane) adhesive to blow over the top of the filter media and/or polyurethane to blow across the filter media flow area. Beneficially, the implementation of the filter frame can improve pressure drop across the filter element and limit performance variability. The filter frame may be configured to improve filter element performance with filter elements that have one or more axial seal members disposed outside of the filter media (e.g., media block). In some embodiments, the filter frame may be configured to improve filter element performance with filter elements that have one or more radial seal members disposed outside of the filter media (e.g., media block). Additionally, the filter frame includes a handle portion that is configured to provide ease of servicing while minimizing detrimental flow effects that typically occur from placing a structure (e.g., the handle) along the flow path.

Figure 1:
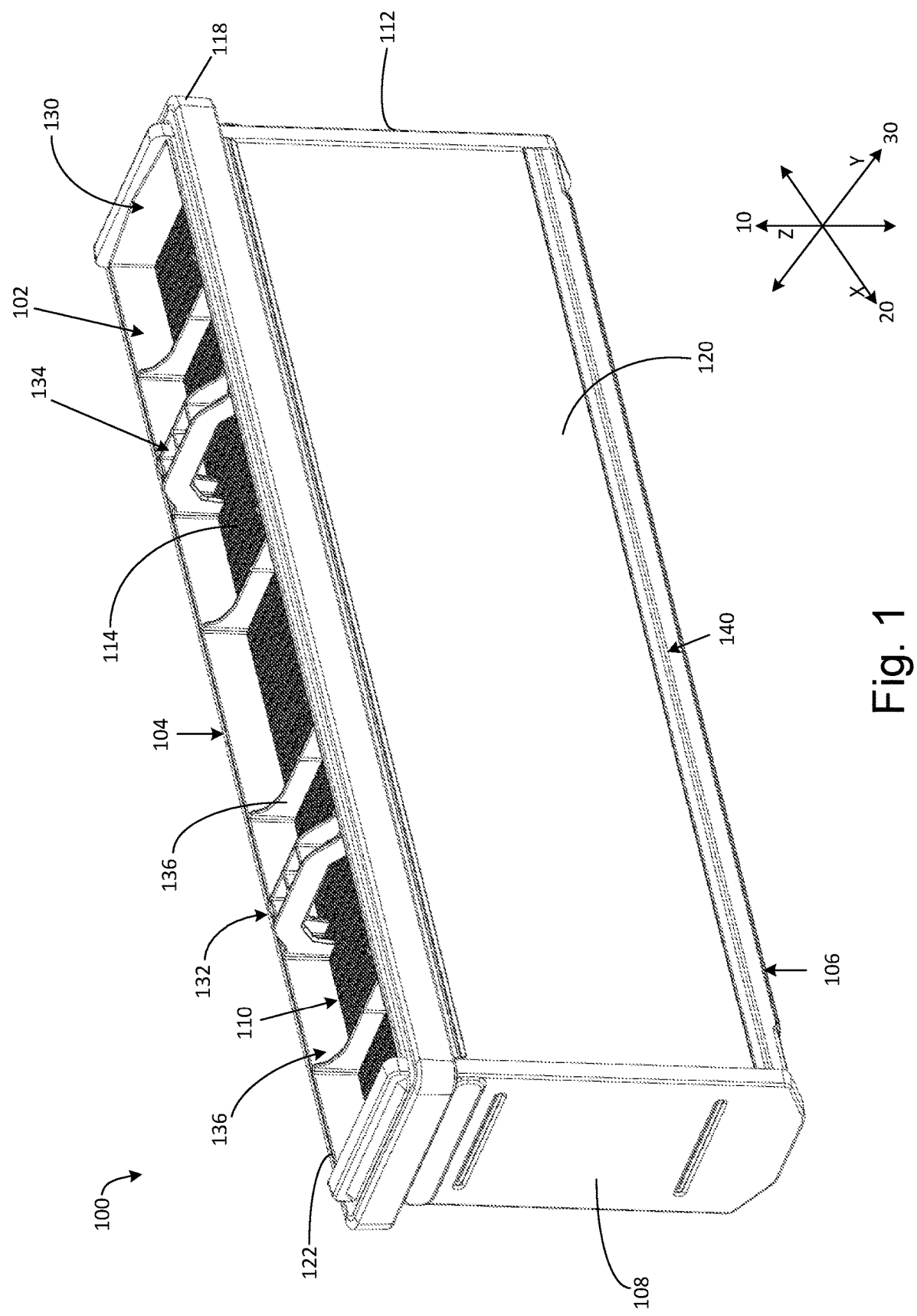
FIG. 1 shows a perspective view of a filter element with a filter frame, according to an example embodiment.
Figure 4:
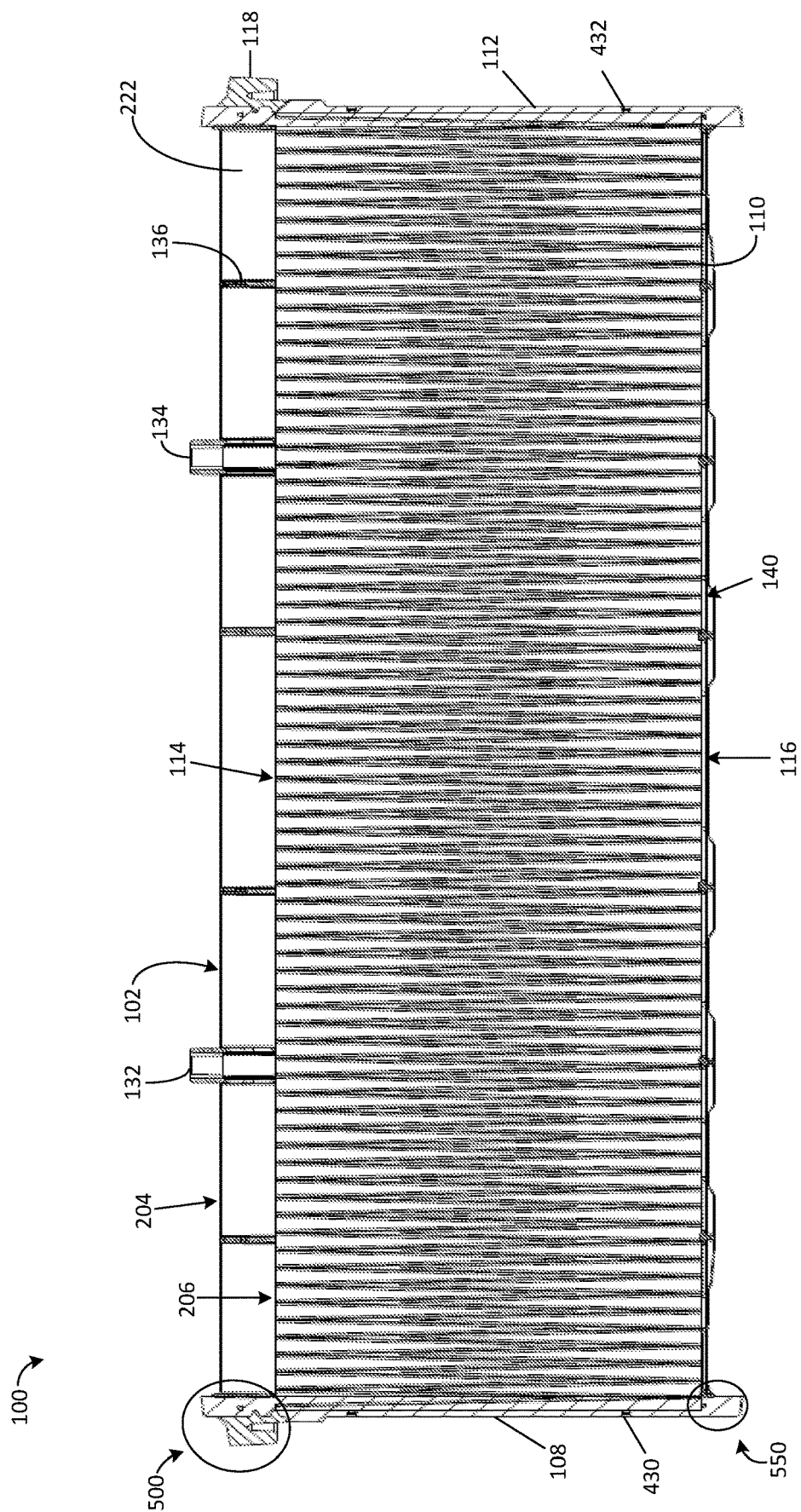
FIG. 4 shows a cross-sectional front view of the filter element with the filter frame of FIG. 1.

Turning to FIG. 1, a filter element 100 with a filter frame 102 is shown, according to an example embodiment. The filter element 100 includes a first filter end 104, a second filter end 106, a first end panel 108, a second end panel 112, a first filter sidewall 120, and a second filter sidewall 122. The second filter end 106 is disposed axially away from the first filter end 104 along a z-axis 10, the second end panel 112 is disposed longitudinally away from the first end panel 108 along an x-axis 20 and is substantially perpendicular to the first filter end 104, and the second filter sidewall 122 is disposed laterally away from the first filter sidewall 120 along a y-axis 30. The first filter sidewall 120 and the second filter sidewall 122 extend longitudinally from the first end panel 108 toward the second end panel 112. A seal member 118 is disposed around the first filter end 104 and is configured to engage an outer surface of the first end panel 108 and the second end panel 112 to facilitate the potting of the filter frame 102 within the first end panel 108 and the second end panel 112. In some embodiments, a portion of the seal member 118 may be disposed above (or below) a first media end 114 (or a second media end 116) such that the seal member 118 is substantially around a perimeter of the filter media 110 above or below the end of the filter media 110. In other embodiments, the seal member 118 is positioned coplanar (e.g., adjacent to laterally, in line with, etc.) with the first media end 114 of the filter media 110. In some embodiments, the seal member 118 is not supported by an annular portion of the filter frame 102. The seal member 118 may form an annular seal around a top portion of the filter element 100, engaging the first end panel 108, the second end panel 112, and two sidewalls of the filter frame 102. An outlet frame 140 is disposed adjacent to the second media end 116 (as shown in FIG. 4) and the second filter end 106.

The filter element 100 includes filter media 110 disposed between the first filter end 104 and the second filter end 106, with a first media end 114 (e.g., inlet portion) adjacent the first filter end 104 and a second media end 116 adjacent the second filter end 106. In some embodiments, the filter media 110 has an upstream inlet at the first media end 114 that receives incoming dirty fluid and a downstream outlet at the second media end 116 (as shown in FIG. 4) discharging clean filtered fluid. In one set of embodiments, the filter media 110 is generally formed by a flat sheet of filter media 110 and a formed sheet of filter media 110. The formed sheet includes a plurality of crests formed by curves and/or pleats in the sheet. The plurality of crests form tetrahedron channels between the formed sheet and the flat sheet. Embossments, such as dimples, may be provided on the crests formed by the curves and/or pleats. The embossments help to maintain spacing between adjacent layers of the filter media (i.e., between the formed sheet and the flat sheet), thereby increasing dust holding capacity and lowering pressure drop over similarly configured filter media not having the embossments. In some arrangements, the filter media 110 is pleated along a plurality of bend lines. The bend lines extend axially along an axial direction and include a first set of bend lines extending from the upstream inlet axially towards the downstream outlet, and a second set of bend lines extending from the downstream outlet axially towards the upstream inlet.

In some arrangements, the filter media 110 includes a plurality of inlet tetrahedron flow channels and a plurality of outlet tetrahedron flow channels. The inlet tetrahedron merge in a central portion of the filter material, thereby allowing axial cross-flow of air between the inlet tetrahedron channels prior to the air passing through the filter media. Such an arrangement provides for additional dust loading on the upstream side of the media, which increases filter capacity. Specific arrangements of such tetrahedral filter media are further described in U.S. Pat. No. 8,397,920. In an alternate arrangement, the flow channels comprise flutes that are alternately sealed at the upstream and downstream ends.

Although the filter media 110 is shown as arranged in a panel or pleat block, corrugated filter media (often referred to as pleated filter media 110) is arranged in a panel, a block, a cylinder, or the like, other arrangements. For example, the filter media 110 may comprise, for example, a cylindrical filter block having a circular cross-sectional shape, or arranged in other shapes (e.g., racetrack or oval shapes). The filter media 110 may be substantially rigid such that the shape of the filter media 110 is substantially maintained during installation and use. The rigidity may be achieved through the use of stiffening members (e.g., pleating stabilization beads, spraying with a stiffening agent, such as BASF® Elastocast 55090, polyurethane, or the like, etc.).

Referring to FIGS. 1 and 2A-2B, the filter frame 102 (e.g., inlet frame) includes a frame body 130, a first handle 132, a second handle 134, and a plurality of support ribs 136 (e.g., support structures). The frame body 130 is configured to be inserted within the first filter end 104 and provide structural support to the inlet portion of the filter element 100 and reduce polyurethane blow across and through the filter media 110. In some embodiments, the frame body 130 does not circumscribe entirely around the filter media 110 such that a portion or portions (e.g., endwalls) of the frame body 130 are disposed completely above the filter media 110. In some embodiments, the frame body 130 is configured to extend along two sides of the filter media and across the top portion (e.g., first media end 114) of the filter media 110. The frame body 130 may be formed as a rigid thermoplastic frame, a hard urethane frame, an injection molded frame, a thermoformed frame, a roto-molded frame, a 3D printed frame, a stamped metal frame, or through other processes.

As shown in FIGS. 2A-4, the frame body 130 includes a first frame end 204, a second frame end 206, a first frame endwall 208, a second frame endwall 212, a first frame sidewall 220, and a second frame sidewall 222. The second frame end 206 is disposed axially away from the first frame end 204 along the z-axis 10, the second frame endwall 212 is disposed longitudinally away from the first frame endwall 208 along the x-axis 20 and is substantially perpendicular to the first frame end 204, and the second frame sidewall 222 is disposed laterally away from the first frame sidewall 220 along the y-axis 30. The first frame sidewall 220 and the second frame sidewall 222 extend longitudinally from the first frame endwall 208 toward the second frame endwall 212. While the first frame endwall 208, the second frame endwall 212, the first frame sidewall 220, and the second frame sidewall 222 are shown as adjacent to the first end panel 108, the second end panel 112, the first filter sidewall 120, and the second filter sidewall 122, respectively, of the filter element 100, in some embodiments, the filter frame 102 may be rotated 180-degrees and still properly engage the filter element 100. In some embodiments, the first frame endwall 208 and the second frame endwall 212 are entirely disposed above the filter media 110 such that the first frame endwall 208 and the second frame endwall 212 does not circumscribe around the filter media 110.

The plurality of support ribs 136 provide structural support across the frame body 130. Each rib in the plurality of support ribs 136 extends from the first frame sidewall 220 laterally toward the second frame sidewall 222. Each rib in the plurality of support ribs 136 may be configured to secure the inlet portion 114 of the filter media 110 together and impede and reduce polyurethane blow over the top the filter media 110. Additionally, each rib in the plurality of support ribs 136 may be configured to minimize any detrimental effects of placing a structure along the flow path. In some embodiments, each rib is disposed above the first media end 114 such that a bottom portion of the rib is in contact with the top portion of the filter media 110. As shown in FIGS. 2A & B, the filter frame 102 includes four ribs in the plurality of support ribs 136. A first rib 236 is disposed between the first frame endwall 208 and the first handle 132. A second rib 238 and a third rib 240 are disposed between the first handle 132 and the second handle 134, such that a distance between the first handle 132 and the second rib 238 is substantially similar to a distance between the second handle 134 and the third rib 240. A fourth rib 242 is disposed between the second handle 134 and the second frame endwall 212.

The first handle 132 and the second handle 134 are configured to facilitate installation, removal, and other movement and servicing of the filter element 100. In some embodiments, the first handle 132 and/or second handle 134 are configured to provide structural support to the frame body 130 and assist in securing the inlet portion 114 of the filter media 110 together and impede and reduce polyurethane blow over the top the filter media 110. The first handle 132 and the second handle 134 extend from the first frame sidewall 220 laterally toward the second frame sidewall 222. A plurality of openings 210 are formed along the first handle 132 and the second handle 134. The plurality of openings 210 are configured to minimize or eliminate any detrimental flow effects from placing handles within flow path. The first handle 132 and the second handle 134 may be substantially similar in shape and size and placed along the frame body 130 at locations that are ergonomic and/or optimal for servicing the filter element 100. In some embodiments, a single handle may be implemented.

Each handle includes a first angled portion 214, a traverse portion 216 (e.g., laterally extending portion), and a second angled portion 218. The first angled portion 214 extends from the first frame sidewall 220 at an upward angle toward the traverse portion 216. In some embodiments, the first angled portion 214 extends from the first frame sidewall 220 at an upward angle of approximately forty degrees with respect to the second frame end 206. The traverse portion 216 is substantially flat and extends from the first angled portion 214 toward the second angled portion 218. The second angled portion 218 extends from the traverse portion 216 at a downward angle toward the second frame sidewall 222. In some embodiments, the second angled portion 218 extends from the traverse portion 216 at a downward angle of approximately forty degrees with respect to the first frame end 204. As shown in FIGS. 2A & B, the first angled portion 214 and the second angled portion 218 may extend upward above the first filter end 104 such that a portion of the traverse portion 216 is disposed above (e.g., outside of) the first filter end 104. In some embodiments, the first angled portion 214, the second angled portion 218, and the traverse portion 216 may form a substantially "c"-shaped or arch-shaped handle. In some embodiments, the first handle 132 and/or the second handle 134 includes only a first angled portion 214 and a second angled portion 218. In other embodiments, the first handle 132 and/or second handle 134 includes the first angled portion 214 and the traverse portion 216. In other embodiments, the first handle 132 and/or second handle 134 includes only a traverse portion 216 extending from the first frame sidewall 220 laterally toward that second frame sidewall 222.

The first handle 132 or the second handle 134 is provided to assist a user to easily interface and remove the respective filter element 100 from a housing or shell, preferably without the use of tools. By eliminating or minimizing the need for a tool, the first handle 132 or the second handle 134 helps reduce and/or prevent damage to the housing during removal of the filter element 100. Each respective handle is sized to receive at least one of the user's hands so it may be easily grasped to assist in removal. Additionally, the handle may remain small enough (with openings included therein) to not cause any detrimental effect on the flow characteristics of the filtration system. To assist in removal, the user may grasp the first handle 132 and/or the second handle 134 and then pull and/or leverage the filter element 100 in order to remove the filter element 100 from a housing. In some embodiments, the first handle 132 and/or the second handle 134 may be configured to receive a tool or tools for grasping or clamping the handle to assist in the removal of the filter element 100 from a housing.

Figure 3:
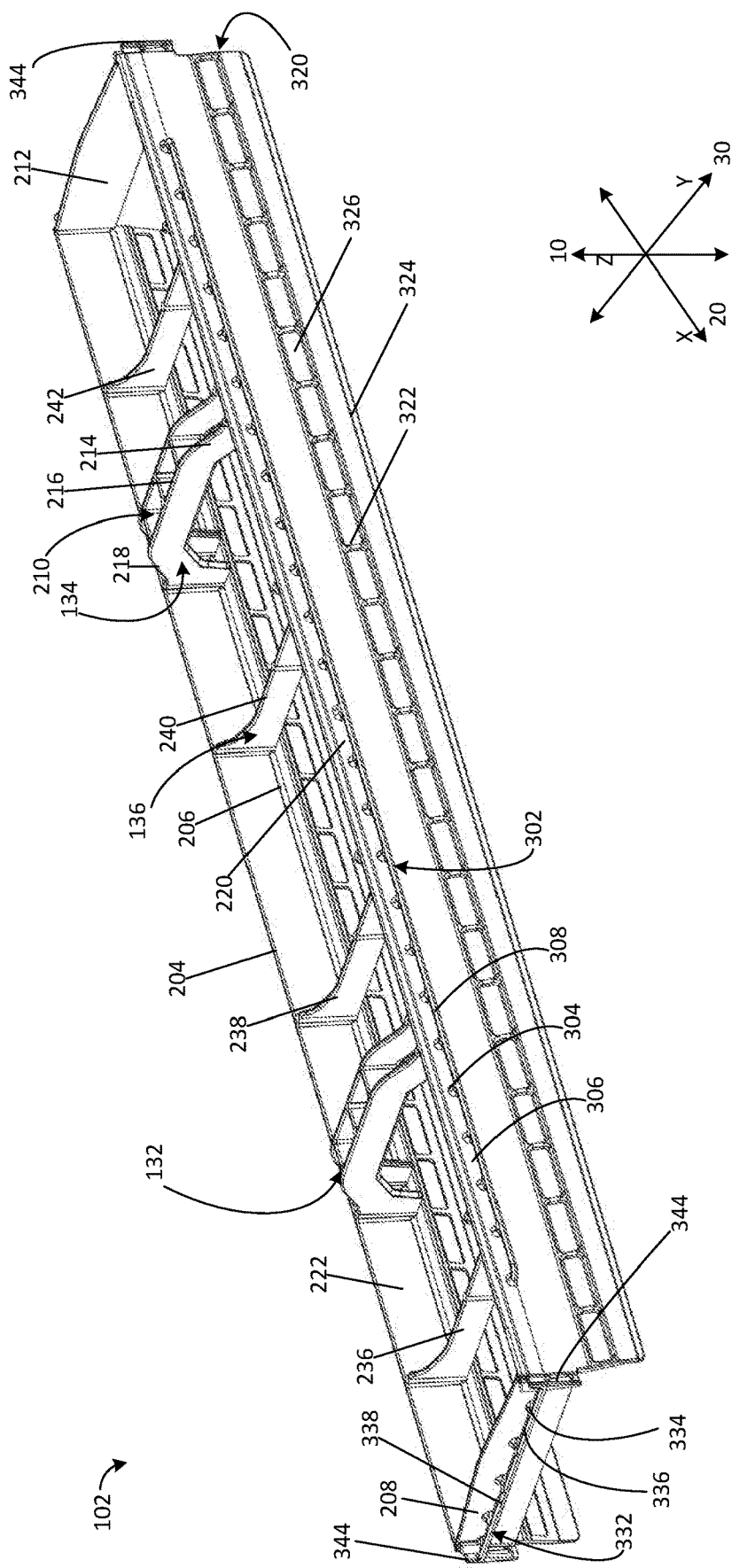
FIG. 3 shows a perspective view of the filter frame of FIG. 1, according to an example embodiment.

Referring to FIG. 3, a perspective view of the filter frame 102 is shown, according to an example embodiment. The filter frame 102 includes a first engagement structure 302, a second engagement structure 320, and a third engagement structure 332, each configured to engage (e.g., potted, mechanically locked, etc.) with a portion of the filter element 100. The filter frame 102 also includes a plurality of endwall support ribs 344. In some embodiments, each endwall support rib in the plurality of endwall support ribs 344 extends longitudinally away from a corner of the frame body 130. In some embodiments, each endwall support rib in the plurality of endwall support ribs 344 is a portion of a frame sidewall that extends past the frame endwall.

The first engagement structure 302 extends from the first frame sidewall 220 laterally away from the first frame sidewall 220 along the y-axis 30. The first engagement structure 302 may be configured to engage the seal member 118 and/or a portion of the first filter sidewall 120. The first engagement structure 302 includes a first plurality of ribs 304 that extend from the first frame sidewall 220 laterally away from the first frame sidewall 220. A first support rail 308 extends from the first rib in the first plurality of ribs 304 longitudinally toward a last rib in the first plurality of ribs 304. A first plurality of openings 306 are formed between the first frame sidewall 220, the first plurality of ribs 304, and the first support rail 308. Specifically, each opening in the first plurality of openings 306 is formed between a pair of ribs in the first plurality of ribs 304, a portion of the first support rail 308, and a portion of the first frame sidewall 220. In some embodiments, the first engagement structure 302 is mechanically locked within the filter element 100 by way of polyurethane (or similar material) being dispensed within the first plurality of openings 306 while the first engagement structure 302 is within the respective portion of the filter element 100. As will be readily apparent, another engagement structure extends from the second frame sidewall 222 laterally away from the second frame sidewall 222 along the y-axis 30 and is similar in structure to the first engagement structure 302. In other words, the engagement structure extending laterally from the second frame sidewall 222 may be the first engagement structure 302 mirrored along the x-axis 20. The mirrored first engagement structure may be configured to engage the seal member 118 and/or a portion of the second filter sidewall 122.

The second engagement structure 320 extends from the first frame sidewall 220 axially away from the first frame sidewall 220 along the z-axis 10. The second engagement structure 320 may be configured to engage the seal member 118 and/or a portion of the first filter sidewall 120. The second engagement structure 320 includes an angled skirt portion 322 and a substantially straight skirt portion 324 that are configured to mask variation in polyurethane blow along the length of the first frame sidewall 220. The angled skirt portion 322 that extends from the bottom of the first frame sidewall 220 substantially axially away from the first frame end 204 at an angle. A second plurality of openings 326 are formed between the first frame sidewall 220, the angled skirt portion 322, and the straight skirt portion 324. As shown best in FIG. 7 below, the straight skirt portion 324 extends from an end of the angled skirt portion 322 axially away from the first frame end 204. A second plurality of openings 326 are formed along the angled skirt portion 322 and are configured to mechanically lock the second engagement structure 320 within a portion of the filter element 100. In some embodiments, the second engagement structure 320 is mechanically locked within the filter element 100 by way of polyurethane (or similar material) being dispensed within the second plurality of openings 326 while the second engagement structure 320 is within the respective portion of the filter element 100. The second engagement structure 320 may possess a wide variety of shapes including none or numerous angled skirt portions, none or multiple openings, and/or none or multiple straight skirt portions. As will be readily apparent, another engagement structure extends from the second frame sidewall 222 axially away from the second frame sidewall 222 along the z-axis 10 and is similar in structure to the second engagement structure 320. In other words, the engagement structure extending axially from the second frame sidewall 222 may be the second engagement structure 320 mirrored along the x-axis 20. The mirrored second engagement structure may be configured to engage the seal member 118 and/or a portion of the second filter sidewall 122.

The third engagement structure 332 extends from the first frame endwall 208 longitudinally away from the first frame endwall 208 along the x-axis 20. The third engagement structure 332 may be configured to engage the seal member 118 and/or a portion of the first filter end panel 108. The third engagement structure 332 includes a third plurality of ribs 334 that extend from the first frame endwall 208 longitudinally away from the first frame endwall 208. A third support rail 338 extends from the first rib in the third plurality of ribs 334 laterally toward a last rib in the third plurality of ribs 334. A third plurality of openings 336 are formed between the first frame endwall 208, the third plurality of ribs 334, and the third support rail 338. Specifically, each opening in the third plurality of openings 336 is formed between a pair of ribs in the third plurality of ribs 334, a portion of the third support rail 338, and a portion of the first frame endwall 208. In some embodiments, the third engagement structure 332 is mechanically locked within the filter element 100 by way of polyurethane (or similar material) being dispensed within the third plurality of openings 336 while the third engagement structure 332 is within the respective portion of the filter element 100. As will be readily apparent, another engagement structure extends from the second frame endwall 212 longitudinally away from the second frame endwall 212 along the x-axis 20 and is similar in structure to the third engagement structure 332. In other words, the engagement structure extending longitudinally from the second frame endwall 212 may be the third engagement structure 332 mirrored along the y-axis 30. The mirrored first engagement structure may be configured to engage the seal member 118 and/or a portion of the second filter end panel 112.

Turning to FIG. 4, a cross-sectional front view of the filter element 100 with the filter frame 102 of FIG. 1 is shown. The plurality of support ribs 136, the first handle 132, and the second handle 134 may be disposed above the first media end 114. In some embodiments, the filter frame 102 may not provide an axial seal support portion and does not cover the entire outer periphery of the filter media 110. The filter media 110 is in contact with and rests upon a portion 430 of the first end panel 108 and is in contact with and rests upon a portion 432 of the second end panel 112. A top left portion 500 of the inlet of the filter element 100 of FIG. 4 is shown in FIG. 5A. As will be appreciated, the top right portion of the inlet of the filter element 100 may be a mirror image of the top left portion 500 shown in FIG. 5A. A bottom left portion 550 of the outlet of the filter element 100 in FIG. 4 is shown in FIG. 5B. As will be appreciated, the bottom right portion of the inlet of the filter element 100 may be a mirror image of the bottom left portion 550 shown in FIG. 5A.

As shown in FIG. 5A, the first frame endwall 208 does not extend beyond the first media end 114 such that the filter frame 102 does not wrap around the ends of the filter media 110 (e.g., the sides of the filter media 110 adjacent the first end panel 108 and second end panel 112). During the potting operation of the first end panel 108 and the second end panel 112, the frame body 130 is held onto the filter media 110 to limit polyurethane blow and to limit contact of portions of the frame body 130 with useable portion of the filter media 110. As discussed above in FIG. 3, the filter frame 102 may be potted within the first end panel 108 through the third engagement structure 332. The third engagement structure 332 may be configured to facilitate the first end panel 108 to hold the respective portion(s) of the frame body 130 (e.g., first frame endwall 208). The seal member 118 is attached to an outer portion of the first end panel 108. As will be appreciated, the seal member 118 is also attached to an outer portion of the second end panel 112 in a similar configuration.

As shown in FIG. 5B, the filter media 110 is in contact with and rests upon a portion 430 of the first end panel 108.

An outlet end support wall 554 is configured to impeded urethane blow back over the second media end 116 of the filter media 110. The first end panel 108 and/or outlet frame 140 may implement a first lock 552. The first lock 552 may be configured to facilitate the first end panel 108 to hold the respective portion(s) of the filter media 110, for example, a portion of the second media end 116. The first lock 552 may be a mechanical lock.

Turning to FIGS. 6A and 6B, cross-sectional side views of the filter element 100 with the filter frame 102 of FIG. 1 are shown. The plurality of support ribs 136, the first handle 132, and the second handle 134 may be disposed above the first media end 114. The first filter sidewall 120 and the second filter sidewall 122 are adjacent to and contact the sidewalls of the filter media 110. A top right portion 700 of the inlet of the filter element 100 of FIG. 6A is shown in FIG. 7. The first frame sidewall 220 includes the second engagement structure 320 configured to engage an interior portion of the seal member 118. As shown in FIG. 6B, a portion of the angled skirt portion 322 is disposed within and engages an interior portion of the seal member 118. In some embodiments, a portion of the substantially straight skirt portion 324 may be disposed within and engage an interior portion of the seal member 118. As will be appreciated, during the potting operation of the seal member 118, the frame body 130 is already held onto the filter media 110 by the first end panel 108 and the second end panel 112. The outlet frame 140 includes a first outlet frame sidewall 530, a second outlet frame sidewall 532 and a transverse outlet frame portion 534 extending from the first outlet frame sidewall 530 laterally toward the second outlet frame sidewall 532. The outlet frame 140 is described in greater detail below with respect to FIG. 8.

As shown in FIG. 6B, the first angled portion 214 extends from the first frame sidewall 220 at an upward angle toward the traverse portion 216. While the first angled portion 214 is shown extending from the first frame sidewall 220 at an upward angle of approximately forty-degrees with respect to the y-axis 30, the first angled portion 214 may be angled at a wide range of angles from zero to ninety-degrees with respect to the y-axis 30. The second angled portion 218 extends from the second frame sidewall 222 at an upward angle toward the traverse portion 216. While the second angled portion 218 is shown extending from the second frame sidewall 222 at an upward angle of approximately forty-degrees with respect to the y-axis 30, the second angled portion 218 may be angled at a wide range of angles from zero to ninety-degrees with respect to the y-axis 30.

FIG. 7 depicts the engagement of the first engagement structure 302 with the filter element 100. The second engagement structure 320 includes the angled skirt portion 322 and the substantially straight skirt portion 324. The second engagement structure 320 is configured to mask variation in polyurethane blow along the length of the first frame sidewall 220. In some embodiments, a plurality of holes may be formed in flanges and/or sidewalls of the seal member 118 and/or filter frame 102 to facilitate blow through. The plurality of holes may be disposed at a height that causes the polyurethane to stay away from the first media end 114 and second media end 116, thereby increasing the usable area of the filter media 110. As will be appreciated the top left portion of the inlet of the filter element 100 is a mirror image of the top right portion 700 shown in FIG. 7.

Figure 8:
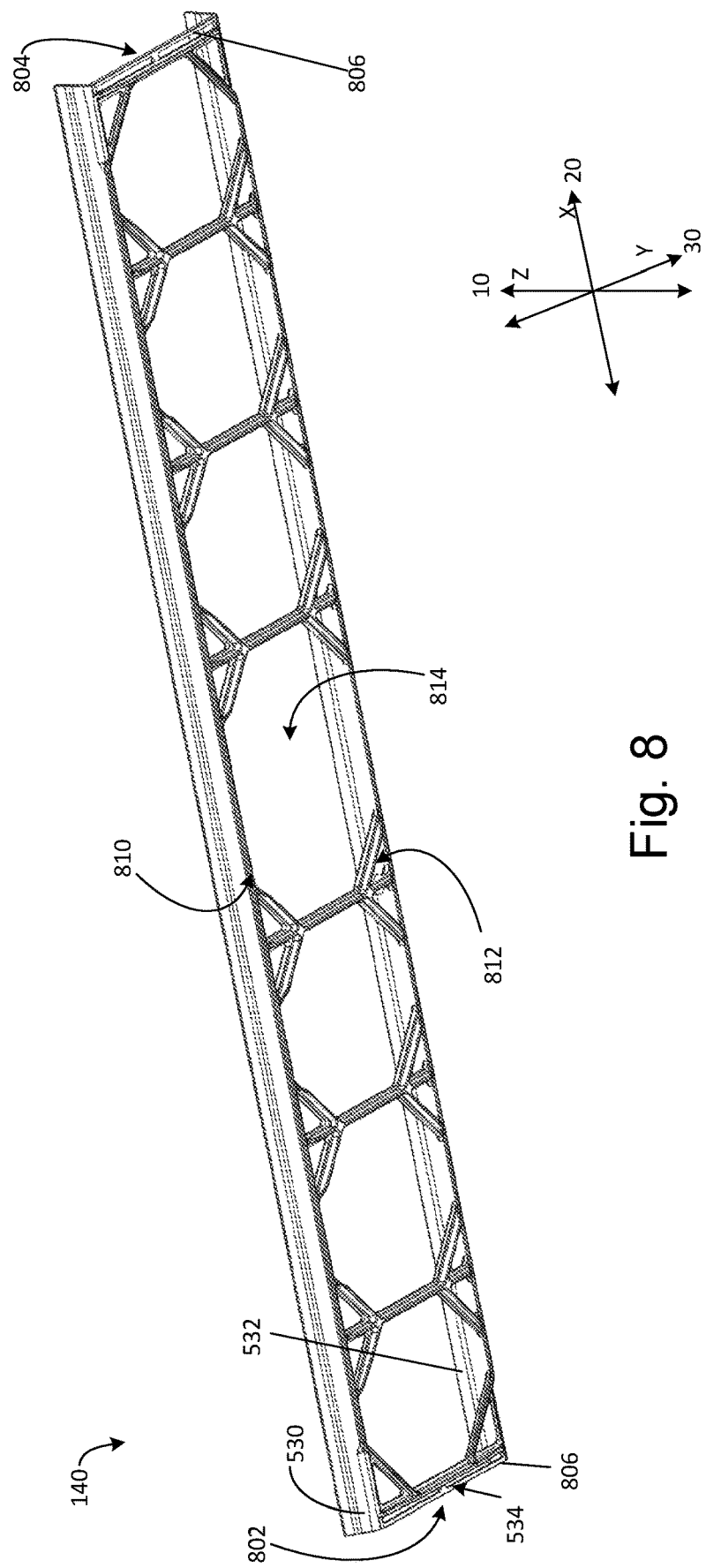
FIG. 8 shows a perspective view of the outlet frame of FIG. 1, according to an example embodiment.

FIG. 8 shows a perspective view of the outlet frame 140 for the filter element 100. The outlet frame 140 includes a first outlet frame end 802 and a second outlet frame end 804. The first outlet frame sidewall 530 extends from the first outlet frame end 802 longitudinally toward the second outlet frame end 804 along the x-axis 20. The second outlet frame sidewall 532 extends from the first outlet frame end 802 longitudinally toward the second outlet frame end 804 along the x-axis 20 and is substantially parallel to the first outlet frame sidewall 530. The transverse outlet frame portion 534 is disposed on each end of the outlet frame 140 (e.g., first outlet frame end 802 and second outlet frame end 804) and extends from the first outlet frame sidewall 530 laterally toward the second outlet frame sidewall 532. A plurality of panels 810 are disposed along the transverse outlet frame portion 534. Each panel in the plurality of panels 810 includes a plurality of supporting ribs 812 and an opening 814 formed within the panel. The plurality of supporting ribs 812 are configured to minimize any detrimental flow effects that typically occur from placing a structure (e.g., the outlet frame 140) along the flow path. The plurality of supporting ribs 812 may include portions that are transverse, angled, and other orientations. A plurality of engagement openings 806 are disposed along the transverse outlet frame portion 534 adjacent each end of the outlet frame 140. The plurality of engagement openings 806 are configured to form a mechanical lock with the filter element 100 and the outlet frame 140 when urethane is disposed within the engagement openings 806.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed (e.g., within plus or minus five percent of a given angle or other value) are considered to be within the scope of the invention as recited in the appended claims. The term "approximately" when used with respect to values means plus or minus five percent of the associated value.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filter element comprising:
   a first filter end;
   a second filter end disposed axially away from the first filter end;
   filter media extending axially between the first filter end and the second filter end;
   a seal member positioned around the first filter end; and
   a filter frame adjacent to the first filter end, the filter frame comprising:
     a first frame end;
     a second frame end disposed axially away from the first frame end;
     a first frame endwall extending axially away from the first frame end toward the second frame end;
     a second frame endwall extending axially away from the first frame end toward the second frame end, the second frame endwall disposed longitudinally away from the first frame endwall;
     a first frame sidewall extending from the first frame endwall longitudinally toward the second frame endwall;
     a second frame sidewall extending from the first frame endwall longitudinally toward the second frame endwall, the second frame sidewall disposed laterally away from the first frame sidewall;
     a first engagement structure extending away from the first frame sidewall and configured to engage a first seal portion of the seal member such that the first engagement structure extends within the seal member;
     a second engagement structure extending from the first frame sidewall axially away from the first frame sidewall, the second engagement structure configured to engage a second seal portion of the seal member, the second seal portion different from the first seal portion; and
     at least one handle configured to facilitate removal and installation of the filter element.

2. The filter element of claim 1, further comprising at least one support rib extending from the first frame sidewall laterally toward the second frame sidewall, the at least one support rib securing an inlet end of the filter media together.

3. The filter element of claim 1, wherein the at least one handle is a first handle, the first handle extending from the first frame sidewall laterally toward the second frame sidewall, and further comprising a second handle spaced longitudinally from the first handle, the second handle positioned between the first handle and the second frame endwall, the second handle extending from the first frame sidewall laterally toward the second frame sidewall.

4. The filter element of claim 3, further comprising a plurality of support ribs, each of the plurality of support ribs extending from the first frame sidewall laterally toward the second frame sidewall, each of the plurality of support ribs securing an inlet end of the filter media together, a first support rib of the plurality of support ribs positioned between the first frame endwall and the first handle, a second support rib of the plurality of support ribs positioned between the first handle and the second handle, a third support rib of the plurality of support ribs positioned between the second handle and the second support rib, and a fourth support rib of the plurality of support ribs positioned between the second handle and the second frame endwall.

5. The filter element of claim 1, wherein the at least one handle comprises a first angled portion, a traverse portion, and a second angled portion, the first angled portion extends from the first frame sidewall toward the traverse portion, the traverse portion extends from the first angled portion toward the second angled portion, and the second angled portion extends from the traverse portion at toward the second frame sidewall.

6. The filter element of claim 5, wherein a first opening is formed in the first angled portion, a second opening is formed in the traverse portion, and a third opening is formed in the second angled portion.

7. The filter element of claim 1, wherein the first frame sidewall and the second frame sidewall are disposed outside of the filter media.

8. The filter element of claim 1, wherein the filter element further comprises:
   a first end panel substantially perpendicular to the first filter end and the second filter end;
   a second end panel, the second end panel disposed longitudinally away from the first end panel and substantially perpendicular to the first filter end and the second filter end; and
   wherein the seal member is configured to engage the first end panel, the second end panel, the first frame sidewall, and the second frame sidewall.

9. The filter element of claim 1, wherein the second engagement structure comprises an angled skirt portion and a substantially straight skirt portion, the angled skirt portion extending from a bottom of the first frame sidewall substantially axially away from the first frame end, the substantially straight skirt portion extending from an end of the angled skirt portion axially away from the first frame end, wherein a plurality of openings are defined between the first frame sidewall, the angled skirt portion, and the substantially straight skirt portion, wherein the plurality of openings are configured to mechanically lock the second engagement structure within a portion of the filter element.

10. The filter element of claim 1, further comprising an outlet frame adjacent to the second filter end, the outlet frame comprising:
    a first outlet frame end;
    a second outlet frame end disposed axially away from the first outlet frame end;

a first outlet frame endwall extending axially away from the first outlet frame end toward the second outlet frame end;

a second outlet frame endwall extending axially away from the first outlet frame end toward the second outlet frame end, the second outlet frame endwall disposed longitudinally away from the first outlet frame endwall;

a first outlet frame sidewall extending from the first outlet frame endwall longitudinally toward the second outlet frame endwall;

a second outlet frame sidewall extending from the first outlet frame endwall longitudinally toward the second outlet frame endwall, the second outlet frame sidewall disposed laterally away from the first outlet frame sidewall;

a transverse outlet frame portion disposed on each end of the outlet frame and extending from the first outlet frame sidewall laterally toward the second outlet frame sidewall; and a plurality of panels disposed along the transverse outlet frame portion, wherein each panel in the plurality of panels includes a plurality of supporting ribs and an opening formed within the panel.

* * * * *